(12) United States Patent
Jagt et al.

(10) Patent No.: US 7,671,520 B2
(45) Date of Patent: Mar. 2, 2010

(54) DISPLAY DEVICE WITH BIREFRINGENT SUBSTRATE

(75) Inventors: Henri Jagt, Eindhoven (NL); Bianca Maria Irma Van Der Zande, Eindhoven (NL); Emiel Peeters, Eindhoven (NL); Peter Albert Cirkel, Bruges (BE); Johannes Willem Hofstraat, Eindhoven (NL)

(73) Assignee: Sumitomo Chemical Co., Ltd., Tokyo (JP)

( * ) Notice: Subject to any disclaimer, the term of this patent is extended or adjusted under 35 U.S.C. 154(b) by 350 days.

(21) Appl. No.: 11/574,261

(22) PCT Filed: Aug. 25, 2005

(86) PCT No.: PCT/IB2005/052793

§ 371 (c)(1),
(2), (4) Date: Feb. 26, 2007

(87) PCT Pub. No.: WO2006/025002

PCT Pub. Date: Mar. 9, 2006

(65) Prior Publication Data

US 2008/0043329 A1 Feb. 21, 2008

(30) Foreign Application Priority Data

Sep. 3, 2004 (EP) ................................ 04104271

(51) Int. Cl.
*H01J 61/42* (2006.01)
(52) U.S. Cl. ................... 313/110; 349/97; 313/112; 313/506

(58) Field of Classification Search ......... 313/110–113, 313/504–512
See application file for complete search history.

(56) References Cited

U.S. PATENT DOCUMENTS

| 4,181,756 A | 1/1980 | Fergason |
| 4,674,840 A | 6/1987 | Bennett |
| 4,688,897 A | 8/1987 | Grinberg et al. |
| 5,691,789 A | 11/1997 | Li et al. |
| 5,844,648 A | 12/1998 | Higa |
| 6,151,088 A | 11/2000 | Higa |
| 6,157,427 A | 12/2000 | Saynor et al. |

(Continued)

FOREIGN PATENT DOCUMENTS

CN 1217796 A 5/1999

(Continued)

OTHER PUBLICATIONS

Bobrov et al., "47.4: Lyotropic Thin Film Polarizers," SID Symposium Digest of Technical Papers, vol. 31, No. 1, pp. 1102-1105, May 31, 2000.

(Continued)

*Primary Examiner*—Joseph L Williams
(74) *Attorney, Agent, or Firm*—Birch, Stewart, Kolasch & Birch, LLP

(57) ABSTRACT

A display device comprising at least one substrate(1, 2), a first and a second electrode(7, 8), a display medium (12) and an optically active layer(3, 5), wherein said optically active layer comprises a polarizer (3) and is arranged between said substrate and said display medium, and wherein said substrate is made of a birefringent material.

12 Claims, 1 Drawing Sheet

U.S. PATENT DOCUMENTS

| | | | |
|---|---|---|---|
| 6,245,399 B1 | 6/2001 | Sahouani et al. | |
| 6,295,102 B1 | 9/2001 | Higa et al. | |
| 6,552,849 B1 | 4/2003 | Furuhashi et al. | |
| 6,669,865 B1 | 12/2003 | Coates et al. | |

FOREIGN PATENT DOCUMENTS

| | | | |
|---|---|---|---|
| CN | 1322304 A | 11/2001 | |
| CN | 1331807 A | 1/2002 | |
| EP | 112488 A1 | 7/1984 | |
| EP | 699938 | 3/1996 | |
| EP | 985953 | 3/2000 | |
| EP | 1437778 A | 7/2004 | |
| JP | 01-210934 A | 8/1989 | |
| JP | 2001210934 A | 11/1989 | |
| JP | 09-090122 A | 4/1997 | |
| JP | 11142829 | 5/1999 | |
| WO | WO-00/04418 A1 | 1/2000 | |

OTHER PUBLICATIONS

Broer et al., Nature, vol. 378, No. 6556, pp. 467-469, Nov. 30, 1995.
S.J. Roosendal et al; "Novel High Performance Transflective LCD With a Patterned Retarder", 2003 SID Intl Symposium Digest of Tech. Papers, Baltimore, MD, May 20, 2003, SID Intl Symp. Digest of Tech. Papers, San Jose, CA, vol. 34, No. 1, pp. 78-81, XP001171710.

DISPLAY DEVICE WITH BIREFRINGENT SUBSTRATE

TECHNICAL FIELD

The present invention relates to display devices comprising at least one substrate, a first and a second electrode, a display medium and an optically active layer, as well as to methods for the production thereof.

TECHNICAL BACKGROUND

Display devices, such as liquid crystal displays (LCDs) and light emitting diode displays (LED-displays) are complex devices. In addition to the display medium, i.e. the liquid crystal layer forming the optical switch in LCDs and the electroluminiscent layer in LED-displays, display devices further comprise a large number of separate films and layers with various functions, such as display substrates and optically active components, such as polarizers, retarders, diffusers, reflectors, transflectors and color filters etc.

Presently, many such optically active components are laminated on the exterior of the display substrates. The actual optical active components are usually sandwiched between protective sheets or applied onto a carrier sheet. Further, adhesive layers are required in order to laminate the layers onto the display substrate. Through the use of these additional layers, each component adds ~100 μm on the display thickness.

Work has been done to enable the use of polymeric substrates instead of conventional glass substrates. Polymeric substrates are desirable since they would allow for the manufacture of less brittle, low weight, flexible displays.

However, the intrinsic flexibility of displays that are based on polymer substrates is limited by the use of passive optical films with a thickness of ~100 μm each, as the bending stiffness of the display scales with the third power of the thickness. Furthermore, several display device applications, such as LCDs using polarization optics for image formation, (such as twisted nematic, super-twisted nematic, in plane switching, vertically aligned nematic, optically compensated birefringence and ferro-electric LCDs) and polyLED-displays using a combination of a retarder and a polarizer for daylight contrast enhancement, require that the display substrates are isotropic, since birefringence in the substrate would impair the optical performance of the display as the polarization of light changes while traveling through a birefringent substrate.

Most polymeric materials exhibit birefringence and are thus not suitable for use as display substrates. A few non-birefringent, or nearly non-birefringent, polymeric substrates with retardation values below 10 nm, have been used with some success. However, upon applying a strain on these substrates, a significant change in their retardation occurs. Such strain might for example occur when a flexible display is being bent. This change in retardation impairs the optical performance of a display device using such substrates.

U.S. Pat. No. 6,151,088 proposes a liquid crystal display based on polymeric birefringent display substrates. A display according to the '088-patent requires that several requirements regarding angles between the polarizer axis, the optical axis of the substrate and the direction of the liquid crystal molecules in the middle portion of the liquid crystal layer. Furthermore the retardation value of suitable substrates is strictly limited. A display device according to the '088-patent is also bound to be unsuitably thick for flexible displays, as polarizers and other optical components are laminated on the outside of the substrate in the same manner as described above.

Thus, it would be advantageous to provide a display device than can utilize birefringent polymeric materials with low or no limitations on the retardation value as display substrates.

SUMMARY OF THE INVENTION

It is an object of the present invention to provide a flexible display device having birefringent substrates while maintaining good optical properties.

In a first aspect the present invention thus provides a display device comprising at least one substrate, a first and a second electrode, a display medium and an optically active layer, which is characterized in that said optically active layer comprises a polarizer and is arranged between said substrate and said display medium, and wherein said substrate is made of a birefringent material.

The terms "birefringent substrate" and "birefringent material" refers to, in addition to the conventional meaning of a substrate or a material which exhibits birefringence, also substrates and materials for use in display devices that may become birefringent under some conditions of normal use for the display device. For example, non-birefringent or essentially non-birefringent materials that becomes birefringent when a strain is applied on them, such as when they are being bent, are also encompassed by the meaning of the terms "birefringent substrate" and "birefringent material".

As used herein, the term "display medium" relates to the active component in the display capable of image formation, i.e. the switching liquid crystal layer in a LCD and the electroluminiscent layer in a polyLED-display or an OLED-display.

As used herein, the terms "optically active layer" and "optically active components" refer to layers/components that affect properties, such as polarization, ellipticity, color spectrum, propagation direction, etc, of light passing through such layers/components.

An optically active layer may comprise one or more optically active components, sub-layers, forming the optically active unit(s) of said layer. An optically active layer may also, in addition to optically active components, comprise optically non-active components (e.g. sub-layers), such as components necessary for the formation of the optically active components, for example alignment films, or protective films protecting the optically active layer from degradation, such as a film that protects an optically active layer from chemical degradation during e.g. ITO-structuring steps.

In display devices, such as polyLED- and OLED-displays with daylight contrast enhancement layers and liquid crystal displays, a polarizer is conventionally positioned between the liquid crystal layer and the end user. One object of such a polarizer is to block light from entering into or exiting from the display unless this light has such a polarization that it is not absorbed by the polarizer.

In a display device according to the present invention, the polarizer is arranged between the substrate and the display medium. Thus, light exiting from the display towards the user will pass the polarizer before passing through the birefringent substrate. In an analogue manner, light entering a display device of the invention will pass the polarizer after having traveled through the substrate. Changes in polarization of the light that takes place in the substrate does not impair the action of the polarizer and thus, in a display device according to the present invention, the birefringence of the substrate will not impair the optical properties of the display device.

Further advantages of a display device according to the present invention is that polarizers, and optionally other optically active components, are located on the inside of the device, thus being protected from environmental influence, such as scratches, humidity and dust. This allows for the construction of thinner displays since the conventional protection layers applied on the outside of the optically active components (if arranged on the outside of the device) may be omitted.

Further advantages with a display device according to the present invention comprise that display devices may be produced that are cheaper, since birefringent substrates may be produced more economically than non-birefringent substrates.

According to the present invention, the substrate may be flexible. Flexible substrates allows for the production of flexible displays, which is highly desired in many present and anticipated applications.

Further, the substrate may be of a polymeric material, e.g. consisting of polyethyleneterephtalate, polyethylenenaphtalate, polycarbonate, polynorbornene, polyethersulphone, polyimide, polyethylene or any suitable combination of two or more thereof. Other polymeric materials suitable for use in a display device according to the present will be apparent to those skilled in the art.

Polymeric birefringent materials are conventionally easier and less costly to produce than polymeric non-birefringent materials.

A polymeric birefringent substrate according to the present invention can be manufactured by melt-extrusion, solvent casting or other methods known to those skilled in the art.

In display devices according to the invention, the retardation of the substrate may be greater than 10 nm, for example greater than 50 nm or greater than 100 nm, under the conditions in which the display is used.

Any suitable polarizer may be used in a display device according the present invention.

One example of such a suitable polarizer comprises a crystallized layer of parallel aligned columnar stacks of lyotropic dyes, such as lyotropic perylene dyes (e.g. as available from Optiva). Such a polarizer may be coated, e.g. doctor blade coated, on a substrate as a volatile solution, in which the dyes form columnar stacks. During the coating, the dye stacks is oriented on the substrate by shear force. The solvent is evaporated, and leaves a thin polarizing film (E-type polarizer) on the substrate. Such a polarizer may be produced very thin (as thin as ~1 µm).

Another polarizer suitable for use in the present display device is a polarizer comprising dichroic dyes incorporated in a polymerized mixture of aligned mesogens or polymers of mesogens. A polymerizable mixture of mesogens or polymers of mesogens, capable of forming a ordered phase, such as a nematic or smectic phase, is applied and aligned on a substrate. After alignment of the mixture on the substrate, the ordered phase is obtained in the mixture, which is then polymerized. Preferably the mixture is capable of forming a highly ordered phase, such as a smectic phase, e.g. smectic B, and when such a mixture is used, the smectic phase is preferably obtained in the mixture before polymerization. The dichroic dyes becomes fixed in and oriented by the polymerized layer. Thus, the polymerized layer becomes a polarizer.

A polarizer may also be formed by attaching dyes to polymers of mesogens, such as a side chain on or comprised in polymers of mesogens, which may be aligned in the LC-phase above the glass transition temperature.

Still another polarizer suitable for use in the present display device is a wideband circular polarizer based on a cholesteric material in which there is a gradient in the helical pitch over the thickness of the cholesteric film.

Yet another type of polarizer suitable for use in the present display device comprises a grid of plane parallel metal wires (e.g. as available from Moxtek). The grid is thin, e.g. about 100-200 nm thick. A grid pitch in the order of about 150 nm is suitable to polarize visible light.

However, any polarizer suitable for use in a display device according to the present invention may be used.

An optically active layer of the present invention may further comprise optically active components, such as polarizers, retarders, transflectors, color filters, in-cell diffusers, reflectors, scattering films and other optically active components known to those skilled in the art.

Such optical components are known to those skilled in the art as optical components necessary for the function of a display device or components improving the performance of the display device. The type, number and arrangement of such optically active components varies with the type of display device, and is known to those skilled in the art.

It has been shown that the optical properties of optically active components, such as polarizers and retarders, change when a strain is applied, and such changes affects the performance of a display device.

Such strain may occur when the display device is bent, wherein an elongation occurs on the convex part of the bent display and a compression occurs on the concave side of the bent display. However, a neutral line exists, often near the center of the display, where essentially no such strain, i.e. elongation or compression, occurs. By arranging above mentioned optical components (polarizers, retarders etc) near this neutral line, i.e. near the display medium, strain related changes in optical properties are minimized, thus improving the performance of the display device.

Any retarders suitable for use in an optically active layer in a display device of the present invention may be used. Such retarders include, but are not limited to, λ/4-retarders, wide band λ/4-retarders, λ/2-retarters, etc.

One example of a retarder suitable for use in a display device according to the present invention is a film formed by aligning a polymerizable mixture of reactive mesogens or LC-monomers on a surface, such as a substrate, optionally provided with an additional film, such as an optically active component, e.g. a polarizer disposed on said substrate, provided with a alignment layer, such as a rubbed polyimide film or a photoalignment layer. A preferred order is then achieved in the mesogen mixture, e.g. by heating to a selected temperature or by other known methods for achieving a preferred order. The mixture is then polymerized to fix the achieved order, resulting in a thin birefringent film exhibiting a good stability.

Optically active components in an optically active layer in a display device of the present invention may be patterned, i.e. that the optically active component comprises at least one domain in which the optical properties are different from the optical properties in another domain of the optically active component.

In certain applications, for instance, but not limited to, transflective LCDs and color displays, it is advantageous or even necessary to utilize patterned optically active components, such as patterned retarders, to obtain good viewing characteristics of the display device. In the present invention, such patterned optically active components are arranged near the display medium, thus reducing parallax problems which occurs when the distance between the optically active component(s) and the display medium is larger, e.g. separated by the substrate.

The display medium may comprise a liquid crystal layer to form a LCD-display, such as, but not limited to those using polarization optics for image formation, for example twisted nematic, vertically aligned, super-twisted nematic and ferro-electric liquid crystal displays.

Liquid crystal displays, LCDs, according to the present invention comprise both displays comprising one substrate, such as stratified LCDs, and displays comprising two substrates sandwiching the display medium.

LCDs according to the present invention comprising two substrates may comprise a first and a second substrate, of which at least one substrate is birefringent. Further, first and second optically active layers are arranged between said front and back substrates, first and a second electrodes are arranged between said first and second optically active layers, and a liquid crystal layer is arranged between said electrodes, wherein at least said first optically active layer comprises a polarizing layer.

LCDs according to the present invention comprise displays as transmissive, reflective and transflective displays. The arrangement of the optically active layer(s) in different types of LCDs are known to those skilled in the art.

In other embodiments of the present invention, the display medium comprises an electroluminiscent layer, i.e. a polyLED- or an OLED-display, especially such polyLED or OLED-displays using a combination of a retarder, e.g. a λ/4-retarder, and a polarizer as a daylight contrast enhancement layer. For example, such a polyLED- or OLED display may comprise a polarizer arranged on a birefringent substrate, a retarder arranged on the polarizer and a polyLED- or OLED-assembly arranged on the substrate with the retarder facing the light transmitting side of the polyLED- or OLED-assembly.

The birefringent substrate, the polarizer and the retarder may be any suitable substrate, polarizer and retarder, respectively, for example any of those described above.

BRIEF DESCRIPTION OF THE DRAWINGS

The present invention will now be further described with aid of the following embodiments with reference to the accompanying drawings in which.

DETAILED DESCRIPTION OF PREFERRED EMBODIMENTS

Figure 1:
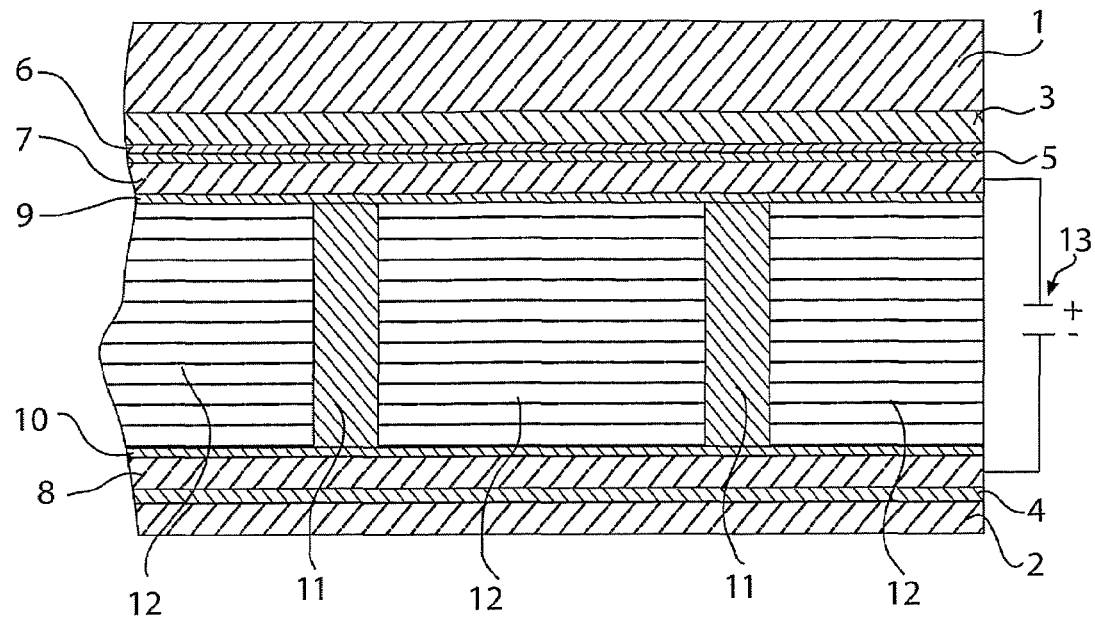
FIG. 1 illustrates a cross-sectional view of a liquid crystal display comprised of two substrates.

A first embodiment of the present invention, as shown in FIG. 1, is a LCD-display comprising a front substrate 1 and a back substrate 2, both made of a birefringent polymeric material.

A front polarizer 3 and a back polarizer 4 are arranged on said front substrate 1 and back substrate 2 respectively. Both the polarizers comprise a dried film of columnar stacks of perylene dyes, forming E-type polarizers on the surface of the substrate.

A retarder 5 is arranged on the front polarizer 3. The retarder is a polymerized mesogen layer and is aligned on an alignment layer 6 disposed on the polarizer.

A first patterned electrode, a conductive patterned ITO-layer, 7 is arranged on the retarder 5 and a second patterned electrode 8 is arranged on the back polarizer 4. Alignment layers of rubbed polyimide 9 and 10 are arranged on the electrodes 7 and 8 respectively, and spacers 11 are litho-graphically disposed on the alignment layer 10. The two substrates are coupled to each other, with the alignment layers 9 and 10 facing each other, and the void between the alignment layers 9 and 10 is filled with a liquid crystal material 12. The electrodes 7 and 8 are connected to a control unit 13, which controls the electrodes, which in turn controls the orientation of the liquid crystal molecules in the liquid crystal material 12 between the electrodes, thus determining the image to be displayed.

Light entering the display, either through the back substrate or the front substrate passes through the back or front polarizers respectively after having passed the birefringent substrate. Thus, light entering the LC-layer will have the desired polarization independent of the birefringence of the substrate. In an analogue manner, light exiting the LC-layer passes the polarizer before being affected by the birefringence of the substrate.

As is realized by those skilled in the art, several modifications to the above described embodiment encompassed by the scope of the claims are possible.

For example, the front and back substrates may be made of the same or different materials, and one of the substrates may be non-birefringent.

The front and back polarizers may be the same or different and may be independently chosen among all polarizers suitable for use in display device according to the present invention.

The retarder may be a patterned or a non-patterned retarder, and may be any retarder suitable for use in a display device according to the present invention. The display device may further comprise additional components, such as color filters for a color display, etc.

The electrodes are not necessarily ITO-electrodes. Other electrodes known by those skilled in the art may be used.

Additional or other components, as described in the present application and encompassed by the appended claims, may also be used in embodiments of the present invention, and the use of these are known to those skilled in the art.

Figure 2:
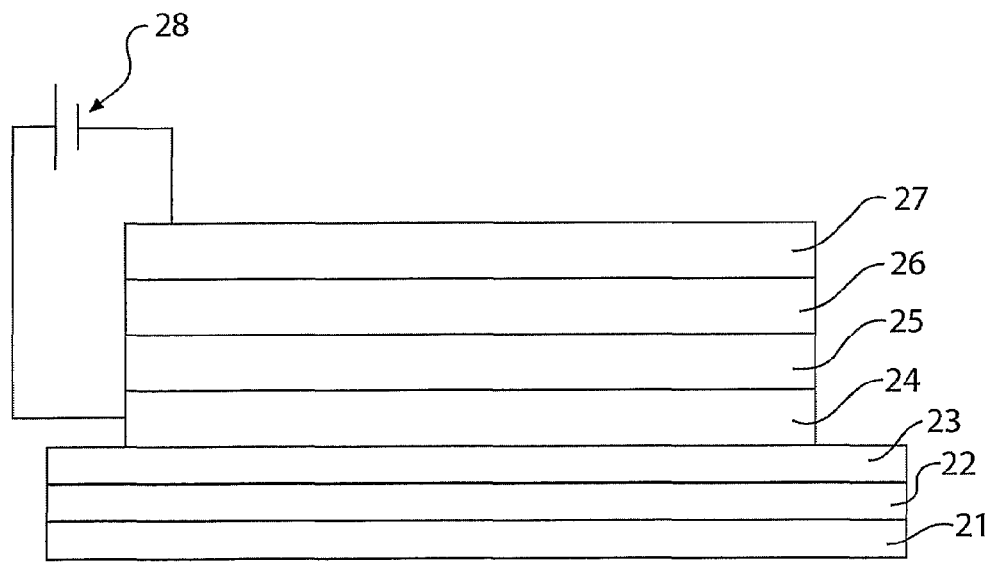
FIG. 2 illustrates a cross-sectional view of a LED-display with daylight enhancement layers.

A second exemplary embodiment of the present invention, as illustrated in FIG. 2, is a polyLED-display equipped with a daylight contrast enhancement layer. It comprises a polymeric birefringent substrate 21, a polarizer 22 arranged on said substrate and a λ/4-retarder 23 arranged on said polarizer.

On top of the polarizer, a polyLED-assembly, comprising of an ITO-anode 24 and a cathode 25 sandwiching a light emitting polymer 26 and a PEDOT (polyethylenedioxythiophene) layer 27, is arranged. The anode 24 and the cathode 25 are connected to a control unit 28, which thus controls the light emission from the light emitting polymer 26, thus determining the image to be displayed.

The embodiments and conditions described herein are illustrative only and are not to be interpreted as limiting the scope of the present invention. The scope of the present invention is limited only by the appended claims. Those skilled in the art will realize that other possible embodiments and conditions also are encompassed by the scope of the appended claims.

The invention claimed is:

1. A display device comprising at least one substrate, a first and a second electrode, a display medium and an optically active layer, wherein:

said optically active layer comprises a polarizer and is arranged between said substrate and said display medium, said substrate is made of a birefringent material, and said polarizer is a polarizer comprising a crystallized layer of parallel aligned columnar stacks of lyotropic dyes, a polarizer comprising dichroic dyes incorporated in a polymerized mixture of aligned mesogens or polymers of mesogens, a polarizer formed by attaching dyes to polymers of mesogens, a wideband circular polarizer based on a cholesteric material, or a polarizer comprising a grid of plane parallel metal wires.

2. The display device according to claim 1, wherein said birefringent material is a polymeric material.

3. The display device according to claim 1, wherein said substrate is flexible.

4. The display device according to claim 1, wherein the retardation of said substrate is greater than 10 nm.

5. The display device according to claim 1, wherein said optically active layer further comprises optically active components selected from the group consisting of polarizers, retarders, color filters, diffusers, scattering films, transflectors and reflectors.

6. The display device according to claim 1, wherein said optically active layer comprises at least one patterned optically active component.

7. The display device according to claim 1, wherein said display medium comprises a liquid crystal layer.

8. The display device according to claim 7, comprising a first and a second substrate of which at least said front substrate is birefringent, a first and a second optically active layer arranged between said front and back substrates, a first and a second electrode arranged between said first and second optically active layers, and a liquid crystal layer arranged between said electrodes, wherein at least said first optically active layer comprises a polarizer.

9. The display device according to claim 1, wherein said display medium comprises an electroluminescent layer.

10. The display device according to claim 9, wherein said electroluminescent layer is comprised in a polyLED-assembly.

11. display device according to claim 9, wherein said electroluminiscent layer is comprised in an OLED-assembly.

12. A method for the manufacture of a display device, comprising:

providing a birefringent substrate;

arranging an optically active layer and a first electrode on one side of said substrate; and arranging a display medium on said substrate provided with said first optically active layer and said first electrode, said first optically active layer and said first electrode facing said display medium;

wherein said polarizer is polarizer comprising a crystallized layer of parallel aligned columnar stacks of lyotropic dyes, a polarizer comprising dichroic dyes incorporated in a polymerized mixture of aligned mesogens or polarizer of mesogens, a polarizer formed by attaching dyes to polymers of mesogens, a wideband circular polarizer based on a cholesteric material, or a polarizer comprising a grid of plane parallel metal wires.

* * * * *